US011069072B2

(12) United States Patent
Das et al.

(10) Patent No.: US 11,069,072 B2
(45) Date of Patent: Jul. 20, 2021

(54) DYNAMIC MULTI-CAMERA TRACKING OF MOVING OBJECTS IN MOTION STREAMS

(71) Applicant: Tata Consultancy Services Limited, Mumbai (IN)

(72) Inventors: Apurba Das, Bangalore (IN); Nihil Saboo, Bangalore (IN); Manikandtan Chiralkunjunni Kartha, Bangalore (IN); Vishnu Chand, Bangalore (IN); Rajarama Nayak, Bangalore (IN)

(73) Assignee: Tata Consaitency Services Limited, Mumbai (IN)

( * ) Notice: Subject to any disclaimer, the term of this patent is extended or adjusted under 35 U.S.C. 154(b) by 0 days.

(21) Appl. No.: 16/691,420

(22) Filed: Nov. 21, 2019

(65) Prior Publication Data
US 2020/0226769 A1  Jul. 16, 2020

(30) Foreign Application Priority Data

Jan. 11, 2019 (IN) .............................. 201921001438

(51) Int. Cl.
*G06T 7/292* (2017.01)
*G06T 7/579* (2017.01)
(Continued)

(52) U.S. Cl.
CPC .............. *G06T 7/292* (2017.01); *G06T 5/002* (2013.01); *G06T 5/20* (2013.01); *G06T 7/194* (2017.01);
(Continued)

(58) Field of Classification Search
None
See application file for complete search history.

(56) References Cited

U.S. PATENT DOCUMENTS

2003/0219146 A1* 11/2003 Jepson ................... G06T 7/251
382/103
2006/0222205 A1* 10/2006 Porikli ................ G06K 9/6212
382/103
(Continued)

FOREIGN PATENT DOCUMENTS

CN            101635852        1/2010

OTHER PUBLICATIONS

Robust Multiple Car Tracking with Occlusion Reasoning. Koller et al. (Year: 1994).*
(Continued)

*Primary Examiner* — Delomia L Gilliard
(74) *Attorney, Agent, or Firm* — Finnegan, Henderson, Farabow, Garrett & Dunner LLP

(57) ABSTRACT

Vehicles are rigid/multi-dimensional objects capable of moving through space which do not undergo structural deformation. Existing systems/techniques analyse videos (e.g., traffic videos) for tracking moving objects either manually or through crowd sourcing and thus are less accurate due to different variations (e.g., non-linear scaling, visibility, occlusion, etc.) caused due to perspective. Present disclosure enable real-time video analytics wherein background from images in de-noised motion streams is filtered to obtain moving objects of interest. Motion map is generated to identify moving objects along-with depth information. Moving objects are then dynamically tracked by multiple cameras from scenes based on previous lost history using spatial, temporal and dynamic properties to obtain redetected moving objects trackers' which are compared with original tracker for detecting and correcting false positives based on a Peak Signal to Noise Ratio value and a detection confidence value associated with the identified moving objects in a particular frame.

15 Claims, 14 Drawing Sheets

(51) Int. Cl.
*G06T 7/194* (2017.01)
*G06T 7/73* (2017.01)
*G06T 7/246* (2017.01)
*G06T 5/00* (2006.01)
*G06T 5/20* (2006.01)

(52) U.S. Cl.
CPC .............. *G06T 7/248* (2017.01); *G06T 7/579* (2017.01); *G06T 7/74* (2017.01); *G06T 2207/10016* (2013.01); *G06T 2207/10028* (2013.01); *G06T 2207/30236* (2013.01)

(56) References Cited

U.S. PATENT DOCUMENTS

| | | | | |
|---|---|---|---|---|
| 2009/0087024 | A1* | 4/2009 | Eaton | G06K 9/00335 382/103 |
| 2012/0170659 | A1* | 7/2012 | Chaudhury | H04N 19/20 375/240.16 |
| 2012/0177121 | A1* | 7/2012 | Tripathi | H04N 19/132 375/240.16 |
| 2014/0201666 | A1* | 7/2014 | Bedikian | G06F 3/04815 715/771 |
| 2014/0201689 | A1* | 7/2014 | Bedikian | G06F 3/04845 715/863 |
| 2015/0310274 | A1* | 10/2015 | Shreve | G06T 7/20 382/103 |
| 2018/0151063 | A1* | 5/2018 | Pun | G08G 1/0116 |

OTHER PUBLICATIONS

Deep Joint Rain and Haze Removal from Single Images. Shen et al. (Year: 2018).*

Shen, L. et al. (Jan. 2018). "Deep joint rain and haze removal from single images," located at https://arxiv.org/pdf/1801.06769.pdf; 7 pages.

Narayana, M. (Jul. 2007). *Automatic Tracking of Moving Objects in Video for Surveillance Applications* (Master's thesis). Retrieved from http://www.ittc-ku.net/research/thesis/documents/manjunath_Narayana_thesis.pdf.

* cited by examiner

DYNAMIC MULTI-CAMERA TRACKING OF MOVING OBJECTS IN MOTION STREAMS

PRIORITY CLAIM

This U.S. patent application claims priority under 35 U.S.C. § 119 to: India Application No. 201921001438, filed on Jan. 11, 2019. The entire contents of the aforementioned application are incorporated herein by reference.

TECHNICAL FIELD

The disclosure herein generally relates to tracking of moving objects, and, more particularly, to dynamic multi-camera tracking of moving objects in motion streams.

BACKGROUND

Object tracking is a process of maintaining identification of an object through a sequence of consecutive images. An object is generally defined in an image with the help of a pixel boundary called its bounding box. The challenges in tracking involves consistently tracking the object while the scene is subject to object deformations, 3D perspective variations, size and shape variation, varying speed of the object, blind spot/occlusion, environmental variability such as glare, shadows, rain, haze, and the like.

Vehicles are rigid objects which do not undergo structural deformation. But since these are 3 dimensional objects capable of moving through space, systems should be able to handle variations caused due to perspective. Such variations include non-linear scaling of different parts of the object with respect to distance from the camera, visibility of different surfaces of the 3D object with respect to object orientation, occlusion (partial and complete) of the object due to presence of other 3 dimensional structures in the scene, variation in the surface pattern of an object due to changes in environmental illumination, contrast and the like. Current systems and methods known in the art either analyze the video manually and take decision or analytics is done through crowd sourcing. This would not address the aforementioned scenarios automatically.

Additionally, detecting and capturing objects from a single motion capturing device may not be clearly possible due to occlusion and there could be loss in its visibility. Further in existing systems, when an object is detected in a Field of View (FoV) by a first motion capturing device and when the same object is detected in another FoV by a second motion capturing device, each of these devices assign a new object identifier which leads to redundant count and inaccurate motion and object detection.

SUMMARY

Embodiments of the present disclosure present technological improvements as solutions to one or more of the above-mentioned technical problems recognized by the inventors in conventional systems. For example, in one aspect, a processor implemented method for dynamic multi-camera tracking of moving objects in motion streams is provided. The method comprises receiving, a plurality of motion streams captured via a plurality of motion capturing devices, pertaining to an environment, wherein each of the plurality of motion streams comprises a plurality of moving objects; filtering, using an adaptive background model, background from images comprised in a plurality of de-noised motion streams obtained from the plurality of motion streams to obtain a plurality of moving objects of interest; iteratively generating, using an occlusion map technique, a motion map to identify one or more moving objects along with depth information from the plurality of moving objects of interest; dynamically tracking, using a tracker technique, the identified one or more moving objects from the plurality of de-noised motion streams, wherein the identified one or more moving objects are dynamically tracked by: iteratively redetecting, using a tracker resurrection algorithm, the identified one or more moving objects from one or more scenes based on a previous lost history to obtain one or more redetected moving objects trackers, wherein the identified one or more moving objects are iteratively redetected by: obtaining spatial, temporal and dynamic properties of the dynamically tracked one or more moving objects and comparing the redetected moving objects trackers with an original tracker; and correcting in real-time, one or more duplicate detection of identifiers of a unique object from at least one of the redetected moving objects trackers and the original tracker using a tracker teleportation algorithm, wherein the one or more duplicate detection of identifiers of a unique object are corrected in real-time by detecting and correcting one or more tracking errors occurred due to false positives based on a Peak Signal to Noise Ratio (PSNR) value and a detection confidence value associated with the identified one or more moving objects in a particular frame.

In an embodiment, the method further comprises generating a global map by extracting information from the plurality of motion capturing devices.

In an embodiment, the step of filtering, using an adaptive background model, background from images comprised in the de-noised plurality of motion streams to obtain a plurality of moving objects of interest comprises: detecting motion in at least two or more consecutive frames in the images comprised in the de-noised plurality of motion streams; mapping pixel displacement associated with the detected motion with background to foreground relationship of a current frame from the at least two or more consecutive frames in the images, wherein the background to foreground relationship in the images is determined by computing mean of variance in pixels comprised in area of the pixel displacement in the images; generating background by using a perspective tail end of one or more moving objects comprised in the current frame from the at least two or more consecutive frames; and filtering the background from the images based on the mapping of the pixel displacement associated with the detected motion with the background to foreground relationship. In an embodiment, the adaptive background model is generated based on the perspective tail end of the one or more moving objects.

In an embodiment, the plurality of de-noised motion streams are obtained by: determining pixel intensity variations in time domain for the plurality of moving objects comprised in the plurality of motion streams; applying high frequency suppression in second ($2^{nd}$) order wavelet decomposition on time sliced images from the plurality of motion streams; obtaining darkest illumination points from the plurality of motion streams; and deriving, using the darkest illumination points, a haze equation and transfer function activation thereof; and de-noising the plurality of motion streams by eliminating rain and fog in the plurality of motion streams using (i) the high frequency suppression in 2nd order wavelet decomposition being applied and (ii) the haze equation and the transfer function activation thereof.

In another aspect, there is provided a system for dynamic multi-camera tracking of moving objects in motion streams. The system comprises a memory storing instructions; one or more communication interfaces; and one or more hardware processors coupled to the memory via the one or more communication interfaces, wherein the one or more hardware processors are configured by the instructions to: receive, a plurality of motion streams captured via a plurality of motion capturing devices, pertaining to an environment, wherein each of the plurality of motion streams comprises a plurality of moving objects; filter, using an adaptive background model, background from images comprised in a plurality of de-noised motion streams obtained from the plurality of motion streams to obtain a plurality of moving objects of interest; iteratively generate, using an occlusion map technique, a motion map to identify one or more moving objects along with depth information from the plurality of moving objects of interest; dynamic track, using a tracker technique, the identified one or more moving objects from the plurality of de-noised motion streams, wherein the identified one or more moving objects are dynamically tracked by: iteratively redetecting, using a tracker resurrection algorithm, the identified one or more moving objects from one or more scenes based on a previous lost history to obtain one or more redetected moving objects trackers, wherein the identified one or more moving objects are iteratively redetected by: obtaining spatial, temporal and dynamic properties of the dynamically tracked one or more moving objects and comparing the redetected moving objects trackers with an original tracker; and correcting one or more duplicate detection of identifiers of a unique object from at least one of the redetected moving objects trackers and the original tracker using a tracker teleportation algorithm, wherein the one or more duplicate detection of identifiers of a unique object are corrected by detecting and correcting one or more tracking errors occurred due to false positives based on a Peak Signal to Noise Ratio (PSNR) value and a detection confidence value associated with the identified one or more moving objects in a particular frame.

In an embodiment, the one or more hardware processors are further configured by the instructions to generate a global map by extracting information from the plurality of motion capturing devices.

In an embodiment, the background from images comprised in the de-noised plurality of motion streams is filtered to obtain a plurality of moving objects of interest by: detecting motion in at least two or more consecutive frames in the images comprised in the de-noised plurality of motion streams; mapping pixel displacement associated with the detected motion with background to foreground relationship of a current frame from the at least two or more consecutive frames in the images, wherein the background to foreground relationship in the images is determined by computing mean of variance in pixels comprised in area of the pixel displacement in the images; generating background by using a perspective tail end of one or more moving objects comprised in the current frame from the at least two or more consecutive frames; and filtering the background from the images based on the mapping of the pixel displacement associated with the detected motion with the background to foreground relationship. In an embodiment, the adaptive background model is generated based on the perspective tail end of the one or more moving objects.

In an embodiment, the plurality of de-noised motion streams are obtained by: (i) removing rain streaks from the time sliced images by determining pixel intensity variations in time domain for the plurality of moving objects comprised in the plurality of motion streams; applying high frequency suppression in 2nd order wavelet decomposition on time sliced images from the plurality of motion streams; and (ii) removing haze by obtaining darkest illumination points from the plurality of motion streams; and deriving, using the darkest illumination points, a haze equation and transfer function activation thereof; and de-noising the plurality of motion streams by eliminating rain and fog in the plurality of motion streams using (i) the high frequency suppression in 2nd order wavelet decomposition being applied; and (ii) the haze equation and the transfer function activation thereof.

In yet another aspect, there are provided one or more non-transitory machine readable information storage mediums comprising one or more instructions which when executed by one or more hardware processors causes a method for dynamic multi-camera tracking of moving objects in motion streams. The method when executed by the instructions comprises receiving, a plurality of motion streams captured via a plurality of motion capturing devices, pertaining to an environment, wherein each of the plurality of motion streams comprises a plurality of moving objects; filtering, using an adaptive background model, background from images comprised in a plurality of de-noised motion streams obtained from the plurality of motion streams to obtain a plurality of moving objects of interest; iteratively generating, using an occlusion map technique, a motion map to identify one or more moving objects along with depth information from the plurality of moving objects of interest; dynamically tracking, using a tracker technique, the identified one or more moving objects from the plurality of de-noised motion streams, wherein the identified one or more moving objects are dynamically tracked by: iteratively redetecting, using a tracker resurrection algorithm, the identified one or more moving objects from one or more scenes based on a previous lost history to obtain one or more redetected moving objects trackers, wherein the identified one or more moving objects are iteratively redetected by: obtaining spatial, temporal and dynamic properties of the dynamically tracked one or more moving objects and comparing the redetected moving objects trackers with an original tracker; and correcting one or more duplicate detection of identifiers of a unique object from at least one of the redetected moving objects trackers and the original tracker using a tracker teleportation algorithm, wherein the one or more duplicate detection of identifiers of a unique object are corrected by detecting and correcting one or more tracking errors occurred due to false positives based on a Peak Signal to Noise Ratio (PSNR) value and a detection confidence value associated with the identified one or more moving objects in a particular frame.

In an embodiment, the method when executed by the instructions further comprises generating a global map by extracting information from the plurality of motion capturing devices.

In an embodiment, the step of filtering, using an adaptive background model, background from images comprised in the de-noised plurality of motion streams to obtain a plurality of moving objects of interest comprises: detecting motion in at least two or more consecutive frames in the images comprised in the de-noised plurality of motion streams; mapping pixel displacement associated with the detected motion with background to foreground relationship of a current frame from the at least two or more consecutive frames in the images, wherein the background to foreground relationship in the images is determined by computing mean of variance in pixels comprised in area of the pixel displacement in the images; generating background by using a perspective tail end of one or more moving objects comprised in the current frame from the at least two or more consecutive frames; and filtering the background from the images based on the mapping of the pixel displacement associated with the detected motion with the background to foreground relationship. In an embodiment, the adaptive background model is generated based on the perspective tail end of the one or more moving objects.

In an embodiment, the plurality of de-noised motion streams are obtained by: (i) removing rain streaks by determining pixel intensity variations in time domain for the plurality of moving objects comprised in the plurality of motion streams; applying high frequency suppression in 2nd order wavelet decomposition on time sliced images from the plurality of motion streams; (ii) removing haze by obtaining darkest illumination points from the plurality of motion streams; and deriving, using the darkest illumination points, a haze equation and transfer function activation thereof; and de-noising the plurality of motion streams by eliminating rain and fog in the plurality of motion streams using (i) the high frequency suppression in 2nd order wavelet decomposition being applied and (ii) the haze equation and the transfer function activation thereof.

It is to be understood that both the foregoing general description and the following detailed description are exemplary and explanatory only and are not restrictive of the invention, as claimed.

In an embodiment, when a new object is detected, a (temporary) tracker is created wherein the new object is determined as an object of interest based on a confidence value computed based on motion direction, consistency in velocity and detection.

Upon determining that the Object of Interest (OoI) is being tracked, the OoI is masked from images comprised in the motion streams after performing background filtering and prior to background learning, thus refraining from merging of static object of interest with the background.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
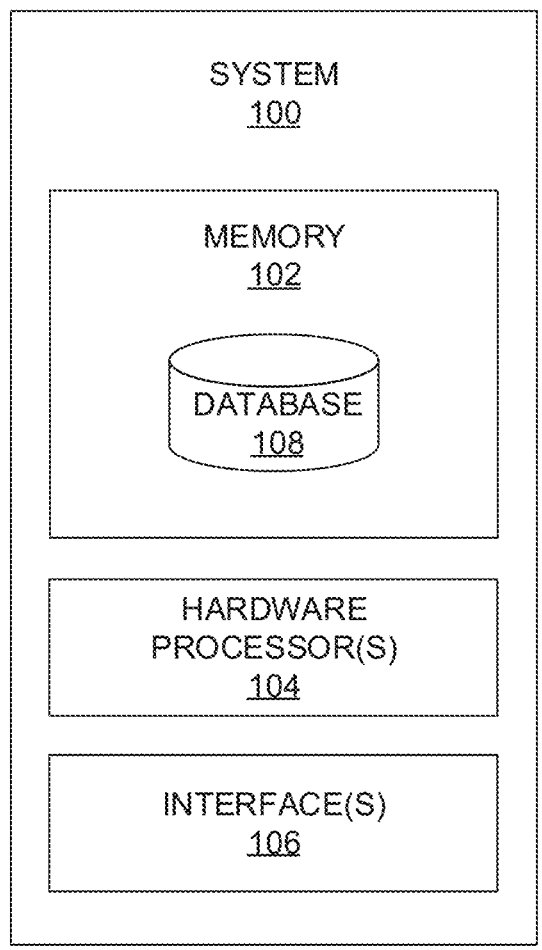
FIG. 1 illustrates an exemplary block diagram of a system implementing techniques for dynamic multi-camera tracking of moving objects in motion streams, in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Referring now to the drawings, and more particularly to FIGS. 1 through 13E, where similar reference characters denote corresponding features consistently throughout the figures, there are shown preferred embodiments and these embodiments are described in the context of the following exemplary system and/or method.

FIG. 1 illustrates an exemplary block diagram of a system implementing techniques for dynamic multi-camera tracking of moving objects in motion streams, in accordance with an embodiment of the present disclosure. The system 100 may also be referred as 'a moving objects tracking system' or 'a dynamic tracking system' and interchangeably used hereinafter. In an embodiment, the system 100 includes one or more processors 104, communication interface device(s) or input/output (I/O) interface(s) 106, and one or more data storage devices or memory 102 operatively coupled to the one or more processors 104. The one or more processors 104 may be one or more software processing modules and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the device 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment a database 108 can be stored in the memory 102, wherein the database 108 may comprise information, for example, a plurality of motion streams/videos captured from image capturing device(s), filtered data, rain and haze data, false positives/errors and corrected duplicate detection of identifiers of a unique object thereof, moving objects trackers, comparison information pertaining to the moving objects trackers and original tracker, spatial, temporal and dynamic properties of the dynamically tracked one or more moving objects, Peak Signal to Noise Ratio (PSNR) value and a detection confidence value associated with the identified one or more moving objects, background to foreground relationship, pixel displacement mapping information, perspective tail end of one or more moving objects comprised in frames of the motion streams, pixel intensity variations in time domain, and the like. In an embodiment, the memory 102 may store (or stores) one or more technique(s) (e.g., adaptive background model, occlusion map technique(s), tracker technique(s), tracker resurrection algorithm, tracker teleportation algorithm, rain removal technique(s), high frequency suppression technique(s), haze removal technique(s) including haze equation derivation and transfer function activation, and the like) which when executed by the one or more hardware processors 104 perform the methodology described herein. The memory 102 further comprises (or may further comprise) information pertaining to input(s)/output(s) of each step performed by the systems and methods of the present disclosure.

Figure 2:
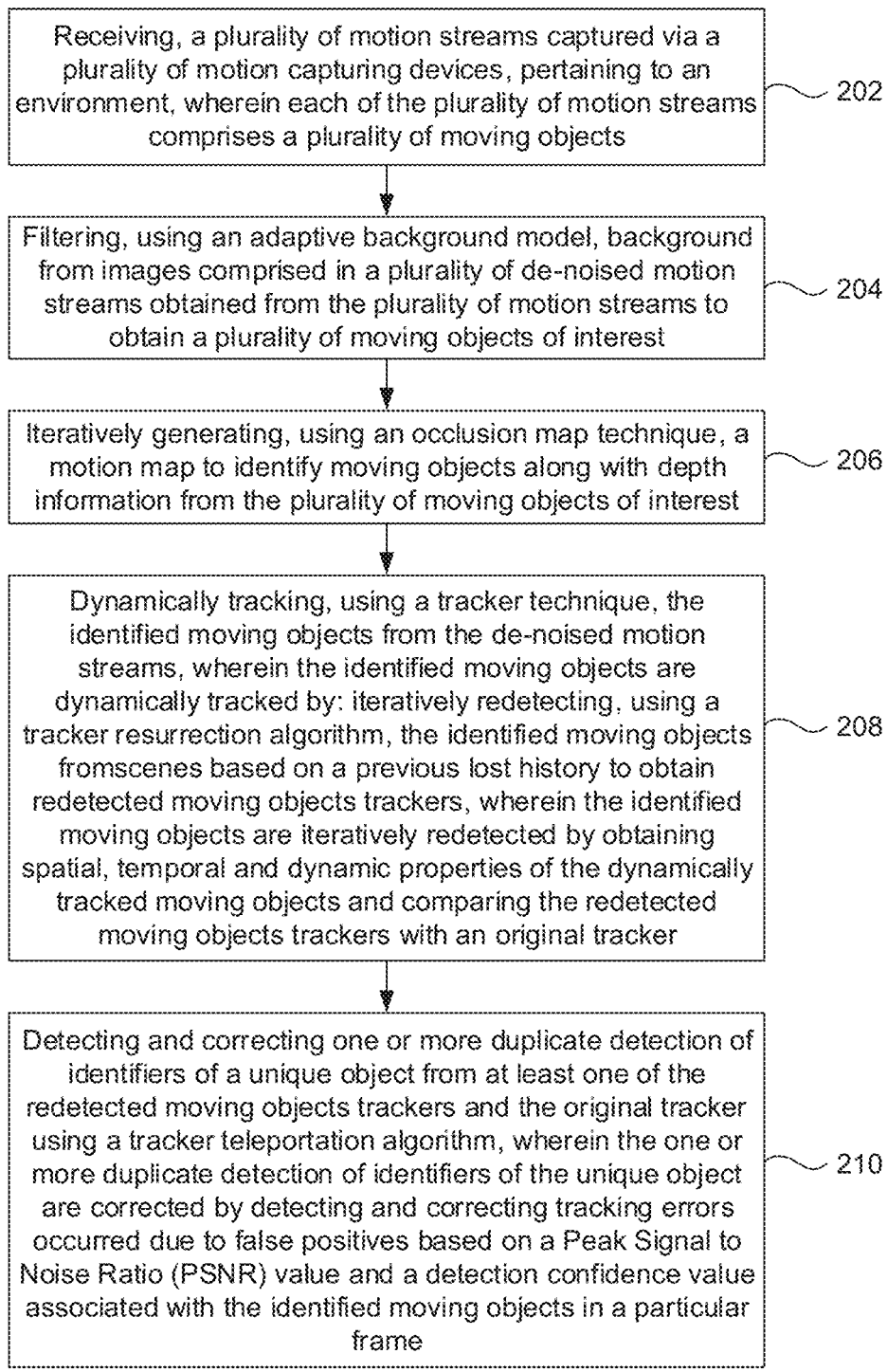
FIG. 2 illustrates an exemplary flow diagram of a method for dynamic multi-camera tracking of moving objects in motion streams using the system of FIG. 1 in accordance with an embodiment of the present disclosure.

FIG. 2, with reference to FIG. 1, illustrates an exemplary flow diagram of a method for dynamic multi-camera tracking of moving objects in motion streams using the system 100 of FIG. 1 in accordance with an embodiment of the present disclosure. In an embodiment, the system(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to components of the system 100 of FIG. 1, and the flow diagram as depicted in FIG. 2. In an embodiment of the present disclosure, at step 202, the one or more hardware processors 104 receive, a plurality of motion streams captured via a plurality of motion capturing devices, pertaining to an environment, wherein each of the plurality of motion streams comprises a plurality of moving objects. In an embodiment, the plurality of motion streams may be captured in real-time and processed by the system 100 for video analytics and moving objects detection and tracking in real-time. In another embodiment, the plurality of motion streams may be captured by the motion capturing devices in real-time, but may be processed offline by the system 100 for video analytics and moving objects detection and tracking. In other words, the videos captured by motion capturing devices may be offline videos for which analytics may be performed by the system 100 for detecting and tracking moving objects.

Figure 3:
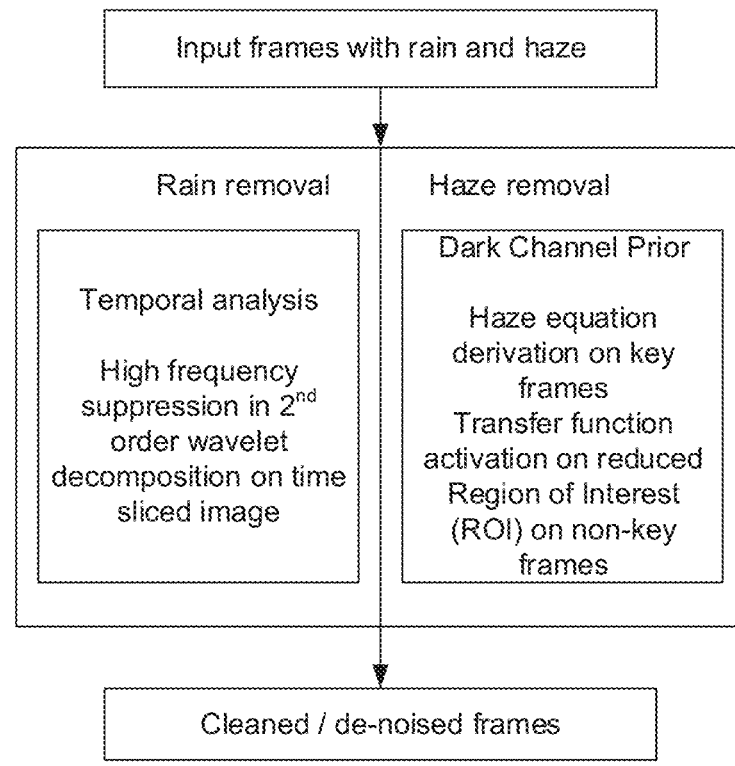
FIG. 3 depicts an exemplary flow diagram depicting rain and haze removal techniques implemented by the system of FIG. 1 to obtain a plurality of de-noised motion streams in accordance with an embodiment of the present disclosure.
Figure 3:
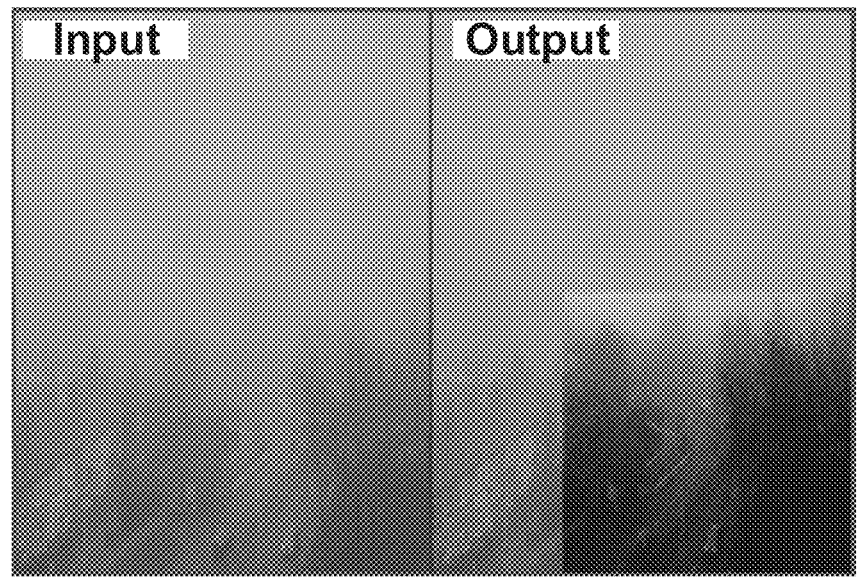

In an embodiment of the present disclosure, at step 204, the one or more hardware processors 104 filter, using an adaptive background model, background from images comprised in a plurality of de-noised motion streams obtained from the plurality of motion streams to obtain a plurality of moving objects of interest. In an embodiment of the present disclosure, the plurality of de-noised motion streams (also referred as cleaned motion streams) are obtained by performing rain removal and haze removal techniques. FIG. 3, with reference to FIGS. 1 through 2, depicts an exemplary flow diagram depicting rain and haze removal techniques to obtain the plurality of de-noised motion streams in accordance with an embodiment of the present disclosure.

In an embodiment of the present disclosure, the rain removal technique is performed by removing rain streaks by determining pixel intensity variations in time domain for the plurality of moving objects comprised in the plurality of motion streams and then a high frequency suppression is applied on time sliced images from the plurality of motion streams in second ($2^{nd}$) order wavelet decomposition. In other words, real-time camera stream(s) is/are processed frame by frame and used to determine variation in the pixel intensities in time domain. The system 100 utilizes the property of rain drops captured by a stationary camera which is observed as fast moving objects. Technique pertaining to time slicing of images can be referred from US Granted patent U.S. Pat. No. 9,792,507 claiming priority from India Provisional application number 1594/MUM/2015, filed on Apr. 17, 2015 the entirety of which is hereby incorporated by reference.

When there is glare in the scenarios the tracker fails to track the object. This is due to high saturation of camera sensor pixels in areas where large quantity of light is directly entering the sensor effectively 'blinding' it. Such high saturation leads to loss of information in the over-exposed pixels. This leads to very low contrast, pattern and texture information which are the inputs trackers depend upon. In such an unavoidable (unconstrained outdoor) scenario, the algorithm looks are the gross pixel intensity variations in the affected and nearby pixel area. This effectively is a motion detection is the surrounding area to the glare effected region. To this end, in an embodiment of the present disclosure, the haze removal technique is performed by processing frame by frame, real-time camera stream(s) and for determining the intensity variations in the three colour channels (e.g., Red, Green and Blue channels). The system 100 utilizes the absolute and relative differences between the different colour channels to determine the amount of baseline illumination, variation between the brightest and darkest illumination points and the relative difference between them to quantify the currently observed haze. On determining the baseline illumination, current atmospheric light dispersal as an effect of fog and the illumination from objects reaching the camera, suitable correction is applied in the area determined to be affected by the atmospheric attenuation. The above entire operation takes approximately 20 milliseconds which permits the use of the haze removal technique to be applied in real-time haze detection and correction. Moreover, the haze removal technique is optimized for real-time detection and correction by computing (infrequently) the amount of haze present and storing the computed haze for a configurable number of frames before it is recomputed to check for variation. Once the amount of haze is determined, all subsequent frames are applied haze correction based on the pre-computed value. In an embodiment of the present disclosure, haze removal is not required in the entire scene and understanding the Region-of-Interest (mostly the sections of road) helps in determining the optimal amount of haze correction to be applied as well reduces the computation time associated with the correction step.

In other words, the haze removal technique includes removing haze by obtaining darkest illumination points from the plurality of motion streams; and deriving, using the darkest illumination points, a haze equation and transfer function activation thereof. Using the output of rain removal and haze removal technique, the plurality of motion streams are de-noised or cleaned to obtain the plurality of de-noised motion streams as depicted in FIG. 3. More specifically, the step of removing haze or (dehazing) involves determining the transmission and atmospheric coefficient from key frame and applying the same in following frames until next key frame. Key frame is obtained by histogram comparison between consecutive frames. If the variation in histogram is significant, then it is declared as a new key frame. Specifically, Haze equation derivation is applied on key frames and transfer function activation is applied only on reduced Region of Interest (ROI) on non-key frames.

In other words, the step of de-noising the plurality of motion streams comprises eliminating rain and haze (fog) in the plurality of motion streams using (i) (i) the high frequency suppression in second ($2^{nd}$) order wavelet decomposition being applied on time sliced images of the motion streams, and (ii) the haze equation on key frames and transfer function activation is applied only on reduced Region of Interest (ROI) on non-key frames, in one example embodiment.

Upon obtaining the plurality of de-noised motion streams, the one or more hardware processors 104 are configured to filter background from images comprised in the plurality of de-noised motion streams, using an adaptive background model, to obtain a plurality of moving objects of interest. More specifically, the background from images comprised in the de-noised plurality of motion streams are filtered by detecting motion in at least two or more consecutive frames in the images comprised in the de-noised plurality of motion streams, mapping pixel displacement associated with the detected motion with background to foreground relationship of a current frame from the at least two or more consecutive frames in the images, wherein the background to foreground relationship in the images is determined by computing mean of variance in pixels comprised in area of the pixel displacement in the images; generating background by using a perspective tail end of one or more moving objects comprised in the current frame from the at least two or more consecutive frames; and filtering the background from the images based on the mapping of the pixel displacement associated with the detected motion with the background to foreground relationship.

The above description of filtering background from images is described below by way of illustrative examples for better understanding of the embodiments of the present disclosure.

Firstly, the motion capturing devices are calibrated to achieve better traffic analytics.

Figure 4A:
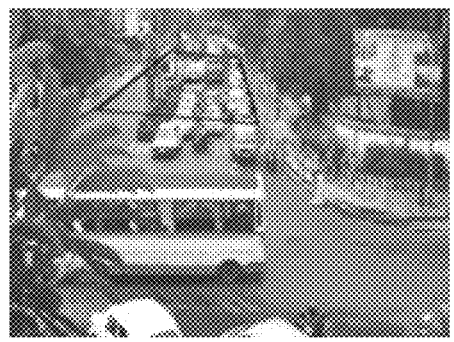
FIGS. 4A through 4C depict a visual representation of identifying point of intersection of any two-real world lines and detecting perspective angle from single unit of vehicle and extrapolating the same to road boundary, in accordance with an example embodiment of the present disclosure.
Figure 4B:
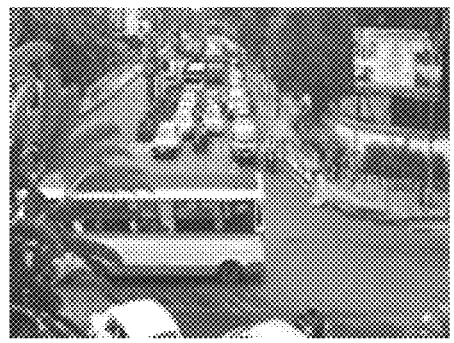
Figure 4C:
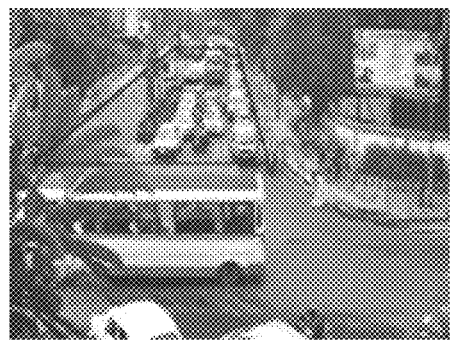
Figure 4D:
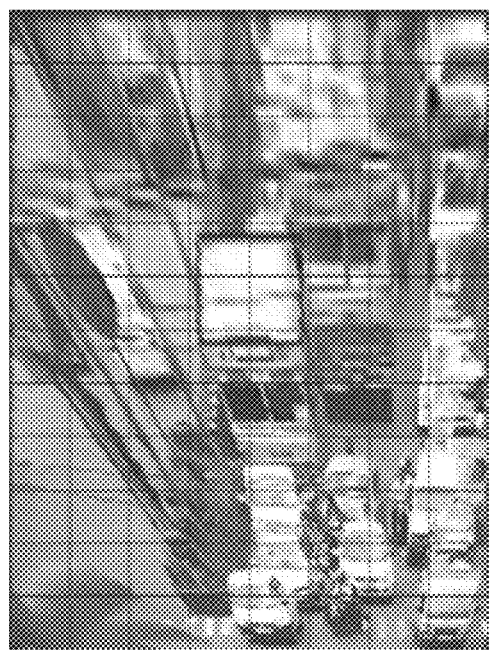
FIGS. 4D and 4E depict mapping of grid points onto an original image captured using the plurality of motion capturing devices and obtaining non-linearity of distance from the perspective angle and vanishing point, in accordance with an example of the present disclosure.
Figure 4E:

The devised calibration technique by the system 100 involves identification of two vanishing point which helps in the identification of the road area with proper orientation. For this, the steps involved are—firstly, identifying the road edges, which contribute to one vanishing point (X—Vanishing point) and then, identifying the point of intersection (Y—Vanishing point) of any two real-world lines that is orthogonal to the lines formed by the edges of the road. Using these information, the system 100 is configured to identify the required road region with minimal error. FIGS. 4A through 4C, with reference to FIGS. 1 through 3, depict a visual representation of identifying point of intersection of any two-real world lines and detecting perspective angle from single unit of vehicle and extrapolating the same to road boundary, in accordance with an example embodiment of the present disclosure. User(s) may be given a choice to visually identify the number of rows and columns the region should be divided into over a perspective corrected image. The choice of row and column is made in such a way that the base of a passenger vehicle fits one grid approximately (error caused by height is not considered). Using the inverse of the perspective matrix, grid points are mapped onto an original image. FIGS. 4D and 4E depict mapping of grid points onto an original image captured using the plurality of motion capturing devices and obtaining non-linearity of distance from the perspective angle and vanishing point, in accordance with an example of the present disclosure.

The steps of filtering background from images using the adaptive background model (e.g., detecting motion in at least two or more consecutive frames, mapping pixel displacement associated with the detected motion with background to foreground relationship; generating background by using a perspective tail end of one or more moving objects comprised in the current frame; and filtering the background from the images based on the mapping of the pixel displacement associated with the detected motion with the background to foreground relationship) are described by way of example below, and this example shall not be construed as limiting the scope of the present disclosure:

1. Each frame consecutively read till the end. Motion score between consecutive images is checked by frame differencing and frames with a high enough motion score are considered for further processing when compared to previous frame
2. Computation of "average of averaged images" is utilized for background filtration. The mean of the variance in the pixels in the image are used to analyze the pixels and decide whether they belong to the background or not.
3. Average image is computed for a given set of buffer frames, wherein edge detection (or high pass filtering) is performed on this image and mean value of the edge image is computed. This mean indicates presence of edges in the image, which can be used as a measure of the suitability for the image in being considered as background.
4. Variances and the corresponding variance (edge) images and average images are stored in an incrementing order of variance value. Only those images with lowest variance may be stored and images with higher variances may be discarded, in one example embodiment
5. The technique employed and implemented by the system 100 to filter background from images may also discard average images with similar edge information so as to not populate the average image array with similar frames, which reduces the total information held by the average image array. The technique of the present disclosure finds areas of difference between the edge images of adjacent average frames (frames having near similar variances) and if they are too low when compared to a percentage of the variance in the image, those frames are considered to be too similar and are hence discarded. The system 100 then dynamically changes penalty for frames in a biased fashion, with frames having high variance having higher thresholds for passing the similarity condition. This is based on the assumption that frames with high variance are generally not good background candidates.
6. When new average frames are computed these are inserted them into the array in the order of increasing variance. The array size is fixed, and when the population of the array exceeds the defined limits, the samples with the highest variance are discarded.
7. Using the currently calculated low edge variance array of averaged images, and average of averages image is created which is used to find the difference image between the current (input) frame and the computed background image. This difference image is subtracted again from difference image computed in the previous frame so as to get only that motion (front and back ends) what is new in this current frame. This frame is saved for subtraction from the next input frame.
8. The background image is improved again (filtering of background from images) by comparing the variance of the average of averages image and the average image in the average image array with the lowest variance. If the singular average image has lower variance, the average of averages is replaced by the single average with lowest variance.

Figure 5:
FIG. 5 depicts a visual representation of filtering background from images using the adaptive background model implemented by the system of FIG. 1, in accordance with an embodiment of the present disclosure.
Figure 6A:
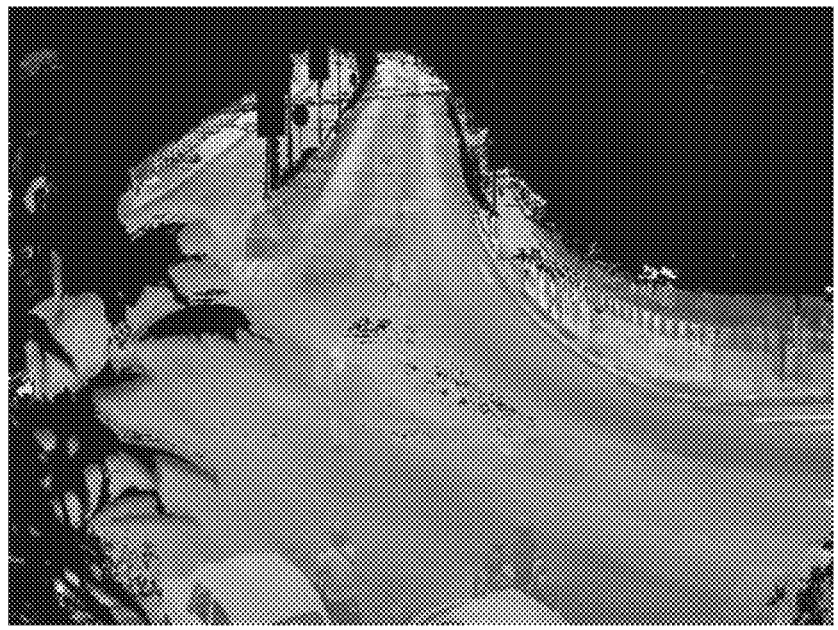
FIG. 6A depicts a visual representation of an image wherein background is painted using the adaptive background model implemented by the system of FIG. 1, in accordance with an example embodiment of the present disclosure.
Figure 6B:
FIG. 6B depicts a visual representation of an image wherein foreground, background, and background masks are returned in the image, in accordance with an example embodiment of the present disclosure.

FIG. 5, with reference to FIGS. 1 through 4E, depicts a visual representation of filtering background from images using the adaptive background model implemented by the system 100 of FIG. 1, in accordance with an embodiment of the present disclosure. In an embodiment, the adaptive background model is generated based on the perspective tail end of the one or more moving objects. In an embodiment of the present disclosure, the expression 'adaptive background model' may also be referred as PaintBG' and interchangeably used hereinafter. Background is painted (updated) in those areas where the current value of image has had a recent variation from background to foreground. This is currently limited to the front portion of vehicles/objects. Front portion means the portion of the object which is facing the direction of motion of the object. FIG. 6A, with reference to FIGS. 1 through 5, depicts a visual representation of an image wherein background is painted using the adaptive background model implemented by the system 100 of FIG. 1, in accordance with an example embodiment of the present disclosure. FIG. 6B, with reference to FIGS. 1 through 6A, depicts a visual representation of an image wherein foreground, background, and background masks are returned in the image, in accordance with an example embodiment of the present disclosure.

Figure 7:
FIG. 7 depicts a visual representation of an image illustrating detection of long duration static vehicles in a scene using Histogram Based Road Segmentation implemented by the system of FIG. 1, in accordance with an example embodiment of the present disclosure.

The above steps of 1 to 8 can be further better understood by way of following description which shall not be construed as limiting the scope of the present disclosure:

Histogram Based Road Segmentation—Detection of long duration static vehicles in the scene:

1. Two consecutive frames are given as input. The frame difference image is taken and masked by the region definition mask for those areas in which a motion based background has been generated. So areas in the background image (obtained from the adaptive background model) are left, which is part of the used-defined road area, but has not yet received any indication of the road pixel information due to lack of motion is those areas.
2. A histogram is computed in all those static areas which are part of the defined road-region. The average Red, Green and Blue channel outputs for this area is derived using Maxima and Minima computation. All those pixels in the neighbourhood of this maxima and minima value for R, G and B within a configurable threshold are isolated. An assumption is made that the majority of the area in image having no motion have road visible and the histogram based average helps in deducing the road peak colour (generally gray, obtained by averaging the three channels). The variation from this value will help detect static vehicles in the user defined road-region. FIG. 7, with reference to FIGS. 1 through 6B, depicts a visual representation of an image illustrating detection of long duration static vehicles in a scene using Histogram Based Road Segmentation implemented by the system 100 of FIG. 1, in accordance with an example embodiment of the present disclosure.

Figure 8A:
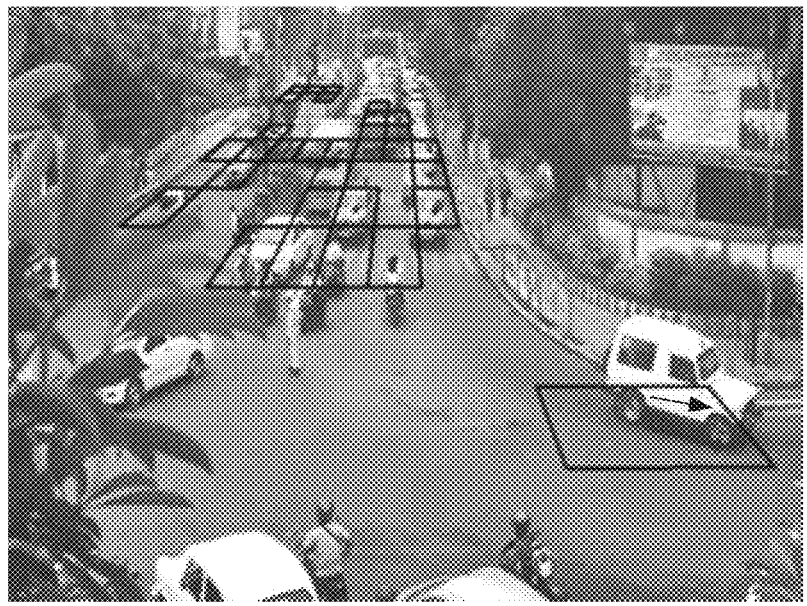
FIG. 8A-8B depict a visual representation of an image illustrating direction detection of vehicles and enablement of grid through vehicle occupancy, in accordance with an example embodiment of the present disclosure.
Figure 8B:

Optical Flow (Direction Detection):

1. Two consecutive frames are taken for calculation of optical flow. The frames are differenced to find motion, then dilated and thresholded to define general area for finding possible feature point locations.
2. Optical flows are computed only on the key points like corners sustained across scale-space. Sparse optical flow technique is used on the detected feature points (LucasKanade) to estimate the new positions of the points in the subsequent frame.
3. The optical flow tracks are accumulated during the course of the lifetime of an object in view. If the system 100 cannot detect the possible next position of the object or if the direction of the tracked feature points have significant variation from the previously observed values, the features are decided to be unreliable and deleted. FIG. 8A-8B, with reference to FIGS. 1 through 7, depict a visual representation of an image illustrating direction detection of vehicles and enablement of grid through vehicle occupancy, in accordance with an example embodiment of the present disclosure.

Moreover, after detecting the vehicles, the sheer based clustering of optical flow points are clustered and grouped. The grouping directions have been validated through vanishing points estimated through camera configured and ego motion of vehicle. Next the larger and smaller groups of vehicle bounding boxes are voted with respect to nearest and farthest sheer cluster from vanishing point. The aforementioned boxes are then joined to visualize as 3D bounding box.

Occupancy detecting and display:
1. The obtained foreground is compared with each grid contour to check for occupancy. A configurable foreground occupancy ration threshold is used to decide whether the grid is occupied or not.
2. The counts for vehicles in the configurable Near, Mid and Far ranges are detected via iterating through the grids in question.
3. The direction is detected by averaging the direction of the optical flow vector within the grid. The center point, angle and magnitude of the vector gives a sense of the speed and direction of the vehicle occupying the grid.
4. The static and moving vehicle counts are compared separately to provide a sense of the current scene dynamic.

Referring back to steps of FIG. 2, upon detecting and obtaining a plurality of moving objects of interest, in an embodiment of the present disclosure, at step 206, the one or more hardware processors 104 iteratively generate, using an occlusion map technique, a motion map to identify one or more moving objects along with depth information from the plurality of moving objects of interest. In an embodiment of the present disclosure, the expression 'motion map' may also be referred as 'occlusion map' and interchangeably used hereinafter.

Figure 9A:
FIG. 9A depict a visual representation of an image illustrating generated occlusion mask from moving vehicles, in accordance with an example embodiment of the present disclosure.

Occlusions are cases where vehicle(s) is/are visually absent in a scene. The occlusion can be partial or full. In such cases where the vehicle is visually absent the regular trackers fail to track. When the vehicles are moving around scene a motion map is created using PaintBG. This motion map represent possible pixels which can have motion caused due to any object in this particular scene perspective. More specifically, the motion map is generated not only to identify moving objects, but also to handle fully or partially occluded objects. FIG. 9A, with reference to FIGS. 1 through 8B, depict a visual representation of an image illustrating generated occlusion mask from moving vehicles, in accordance with an example embodiment of the present disclosure.

Figure 9B:
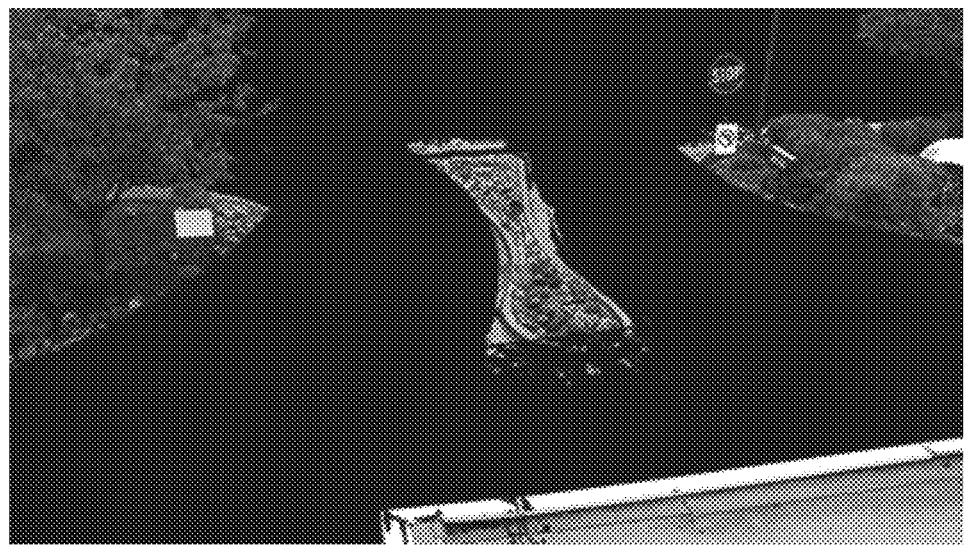
FIG. 9B depict a visual representation of an image illustrating occluding objects overlaid with the occlusion map in accordance with an example embodiment of the present disclosure. The occluding objects contribute to possible occlusions of moving objects, in one example embodiment of the present disclosure.

After a sufficient amount of vehicles passed through scene, all motion maps are accumulated. These maps help in determining where the motions are observed and the negative of this motion map provides the location of possible occlusions in the scene. FIG. 9B, with reference to FIGS. 1 through 9A, depict a depict visual representation of an image illustrating occluding objects overlaid with the occlusion map in accordance with an example embodiment of the present disclosure. The occluding objects contribute to possible occlusions of moving objects, in one example embodiment of the present disclosure.

When object(s) is/are moving through an occlusion zone, the pixels of the object boundary consists of those belonging to the vehicle as well as the occluding objects. The knowledge of the occlusion/motion map helps to avoid the pixels belonging to the occluding object while tracker is updated with the next sequential frame in a video/live camera feed. Hence only the features of the visible part of the vehicle are used to track the vehicle and features of the occluding object are neglected.

Generally when a vehicle is passing behind and occluding object, say like a traffic sign pole, the tracker gets updated by the occluding object and stops following the vehicle. This causes the tracker to get locked to the occluding object and the vehicle is missed. The occlusion map based updating of this information prevents such a scenario.

Handling low contrast/high glare scenarios:

A generated motion map adds as a supplementary information which on the failure of the general tracking algorithm supplies the tracker with the updated vehicle position based on the motion encountered at that particular location in that particular instance of time.

Figure 10A:
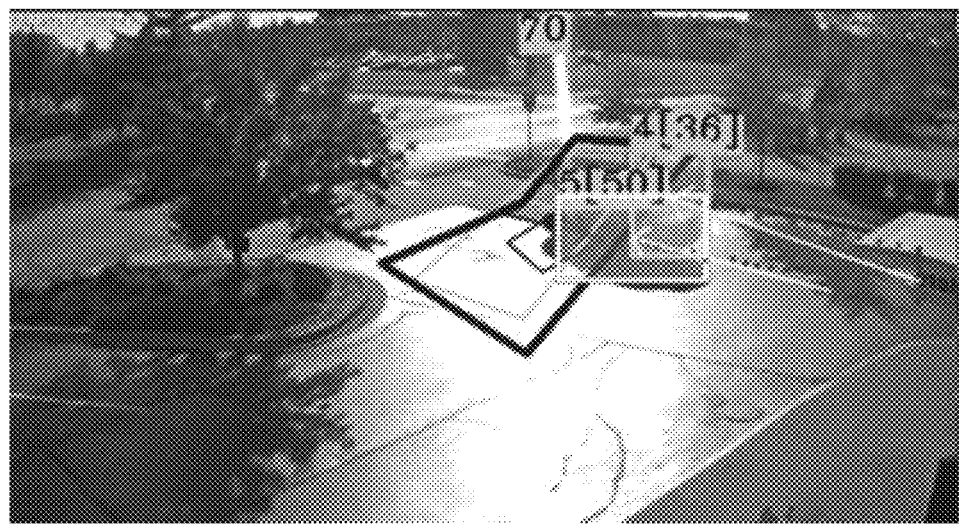
FIG. 10A depicts a visual representation of an image illustrating tracking during glare without motion assist by the system of FIG. 1, in accordance with an embodiment of the present disclosure.
Figure 10B:
FIG. 10B depicts a visual representation of an image illustrating tracking with motion assist by the system of FIG. 1, in accordance with an example embodiment of the present disclosure.

The motion map also helps in boosting the detector confidence where a low confidence detection (another side effect of low contrast/glare) so that even partial detections are upgraded if assisted by a motion in the same spatial and temporal vicinity. FIG. 10A depicts a visual representation of an image illustrating tracking during glare without motion assist by the system 100 of FIG. 1, in accordance with an embodiment of the present disclosure. More specifically, FIG. 10A depicts multiple faulty trackers and loss of tracking accuracy. FIG. 10B depicts a visual representation of an image illustrating tracking with motion assist by the system 100 of FIG. 1, in accordance with an example embodiment of the present disclosure. More specifically, FIG. 10B depicts no false trackers and improved tracking accuracy.

In other words, to prevent such scenarios, at step 208, the one or more hardware processors 104 dynamically track, using a tracker technique, the identified one or more moving objects from the plurality of de-noised motion streams, wherein the identified one or more moving objects are dynamically tracked by: iteratively redetecting, using a tracker resurrection algorithm, the identified one or more moving objects from one or more scenes based on a previous lost history to obtain one or more redetected moving objects trackers, wherein the identified one or more moving objects are iteratively redetected by: obtaining spatial, temporal and dynamic properties of the dynamically tracked one or more moving objects and comparing the redetected moving objects trackers with an original tracker.

Figures 11A, 11B:
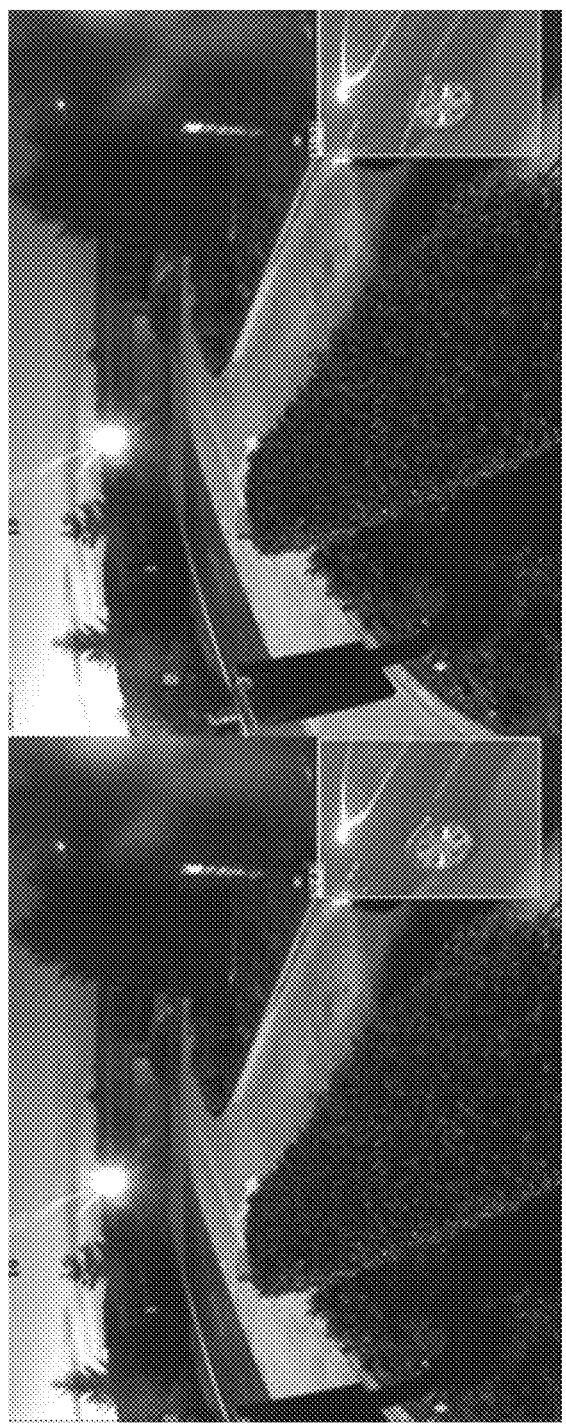
FIGS. 11A and 11B depict a visual representation of an image illustrating (iteratively) vehicle tracking with and without tracker resurrection algorithm enabled, in accordance with an example embodiment of the present disclosure.

Implementation of the tracker resurrection algorithm by the system 100 is described and discussed below:

The occlusion/motion map mentioned above works only for partial occlusions. If no part of the moving object is visible while passing behind an occluding object, the tracker has no information to update itself for a new image. The object of interest is at the "blind spot" in that case. In an embodiment, the expression 'blind spot' may also be referred as 'blindspot' and interchangeably used hereinafter. This causes the tracker to get incorrectly locked to the occluding object. Similarly, when the system fails to detect/track (or iteratively redetect) the object-of-interest (or moving object(s)), possibly due to environmental variations, low contrast etc., the tracker for that object is lost. When even the object-of-interest is re-detected at a later point in time, it creates a new tracker object. This scenario is undesirable because the system 100 essentially counts the object twice and its previous tracked history is lost. To handle such scenarios, the concept of resurrection model/tracker resurrection algorithm is introduced. When a tracker is deleted in an area of the image where a natural termination of a tracker object is not expected, the particular tracker object is added to a list of trackers needing potential resurrection. Similarly when a new detection is observed in an area where sudden new detection are not expected, all new detections are initially tracked temporarily and after confirmation these are added to a list of possible resurrection matches. The two lists are compared at any time to check the spatial, temporal, and dynamic properties (speed, direction of motion, aspect ratio, area, time and location of old tracker (outdated or expired) and new tracker generated and the like) to confirm whether the two trackers are essentially the same physical object. If confirmed so, all the historical information of the previous tracker are passed onto the new tracker, and essentially, the old tracker is resurrected. FIGS. 11A and 11B, with reference to FIGS. 1 through 10B, depict a visual representation of an image illustrating (iteratively) vehicle tracking with and without tracker resurrection algorithm enabled, in accordance with an example embodiment of the present disclosure. When enabled, vehicle identifier (ID) is maintained (top Left of vehicle bounding box).

In an embodiment of the present disclosure, at step 210, the one or more hardware processors 104 correct one or more duplicate detection of identifiers of a unique object from at least one of the redetected moving objects trackers and the original tracker using a tracker teleportation algorithm. In an embodiment, the step of correcting one or more duplicate detection of identifiers of a unique object is preceded by detecting the one or more duplicate identifiers of a unique object, in one embodiment of the present disclosure. The one or more duplicate detection of identifiers of the unique object are corrected by detecting and correcting one or more tracking errors occurred due to false positives based on a Peak Signal to Noise Ratio (PSNR) value and a detection confidence value associated with the identified one or more moving objects in a particular frame, in one example embodiment. In an embodiment the detection confidence value is a probabilistic score (in the range of 0 to 1) which represents confidence of a particular object whether it belongs to that particular class. This score may change based on camera view, hyperactivity and occlusions. The score may be assigned by the system 100 to the object based on the camera view, hyperactivity and occlusions, in one example embodiment.

In an embodiment, when a new object is detected, a (temporary) tracker is created wherein the new object is determined as an object of interest based on a confidence score value computed based on motion direction and consistency in velocity and detection. Upon determining that the Object of Interest (OoI) is being tracked, the OoI is masked from images comprised in the motion streams after background filtering and prior to performing background learning, thus refraining from merging of static object of interest with the background.

Implementation of the tracker teleportation algorithm (also referred as teleportation model) by the system 100 is described and discussed below:

In addition to the tracker resurrection algorithm, the dynamically generated trackers could also result in many false positives, especially when the tracker fails to update correctly. This leads to new detection for the same vehicle and a new tracker being generated even when the old tracker object is still alive.

Such scenarios happen when the following conditions are met:
1. Rapidly moving objects—tracker update region is not large enough to cover the new object position
2. Variation in object view—for non-rigid objects the deformation in the object could lead the tracker to fail to find correlation with the existing knowledge of the object and the new observed position.
3. Occlusion; as discussed previously
4. Illumination variation and other environmental effects.

Figure 12:
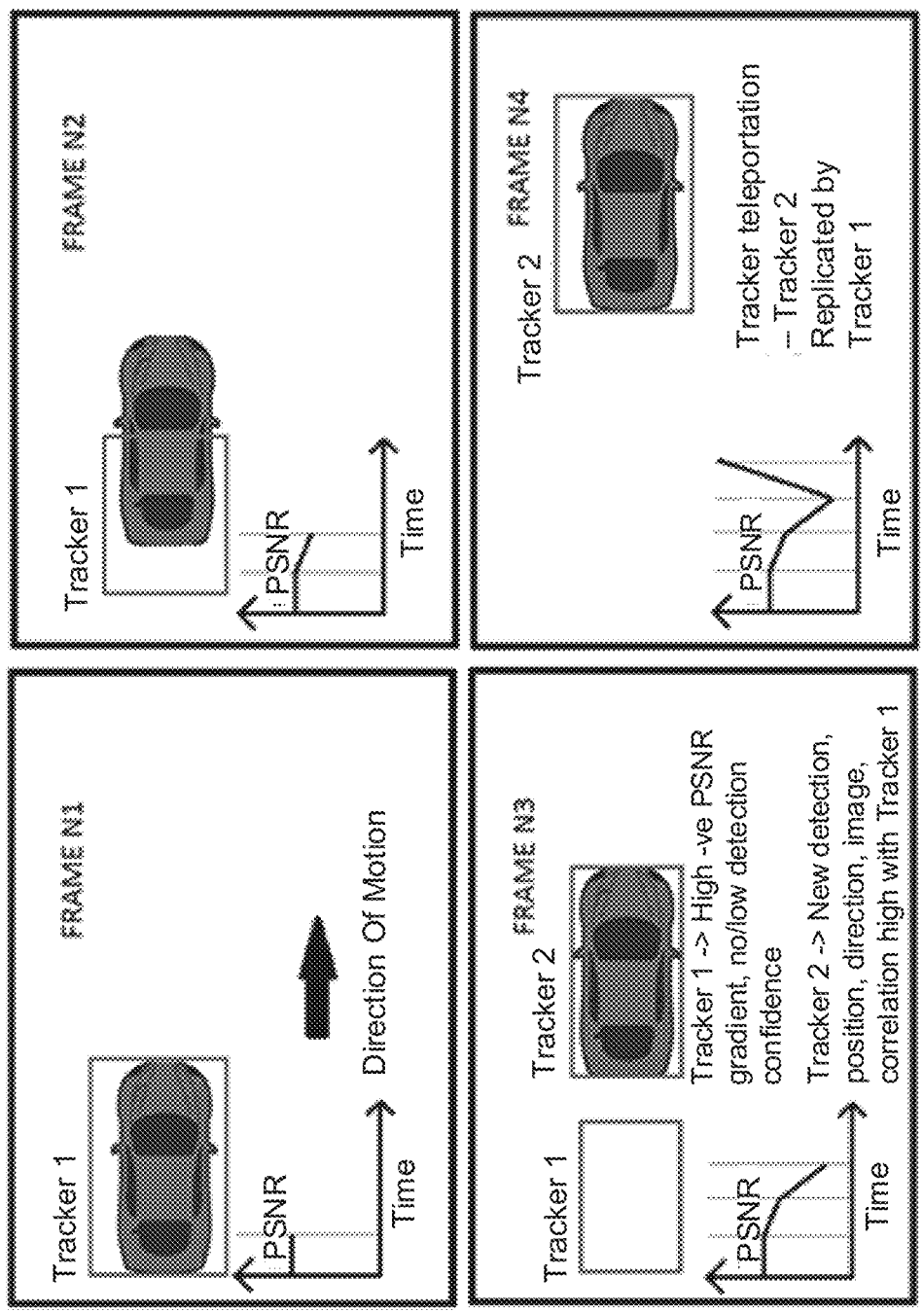
FIG. 12 depicts a Tracker Teleportation Life Cycle (TTLC) as implemented by the system of FIG. 1, in accordance with an example embodiment of the present disclosure.
Figure 13A:
FIGS. 13A through 13E depict visual representation of images illustrating the step of applying high frequency suppression in second ($2^{nd}$) order wavelet decomposition on time sliced images of the plurality of motion streams by the system of FIG. 1 in accordance with an example embodiment of the present disclosure.
Figure 13B:
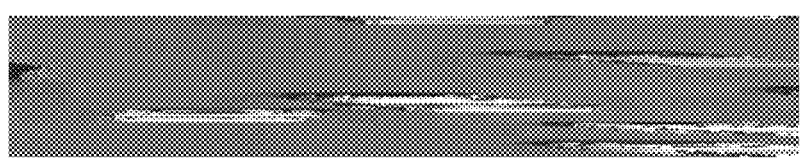
Figure 13C:
Figure 13D:
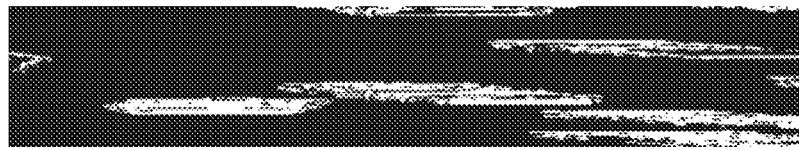
Figure 13E:

The teleportation model pre-emptively detects and corrects such loss in tracker accuracy by utilizing the PSNR value (Peak Signal-to-Noise Ratio) as well as the detection confidence of the tracker object in that particular frame. FIG. 12, with reference to FIGS. 1 through 11B, depicts a Tracker Teleportation Life Cycle (TTLC) as implemented by the system 100 of FIG. 1, in accordance with an example embodiment of the present disclosure.

A tracker which is not correctly updated may have the following properties:
1. The detection confidence of the incorrect tracker is low
2. The PSNR value, which describes the correlation of the historical knowledge of the object from previous frames versus the information according to the current frame, may drop significantly.
3. When a tracker faces sudden drop in PSNR value and low/no detection confidence, it is considered to be a candidate for tracker teleportation and added to a list.
4. Inversely, when a tracker is newly generated within a region new trackers are not expected, it is added to the list of potential duplicate trackers which will be overridden by the teleportation model.
5. Matching is done between possible duplicates and those tracker objects in the teleportation list based on the following properties:
   a. PSNR variation of the old tracker
   b. Position of new tracker
   c. Direction correlation of both trackers
   d. Rate of movement (either in real world coordinates in a calibrated environment like metre/second or image units like pixels/frame) of tracker
   e. Aspect ratio, bounding area etc.
6. Once the match is done, the old tracker is teleported onto the position of the new tracker and a more cohesive tracker history and current state is maintained in the system 100.

In an embodiment of the present disclosure, the system 100 may be further configured by the instructions to generating a global map by extracting information from the plurality of motion capturing devices. As mentioned above, clusters of cameras connected to edge processing machine (s)/system (100) which performs video analytics at the edge and sends the information to a central server (or system 100) which can then proceed to utilize the actionable information obtained from the analytics to understand, regulate or adapt the short-term or long-term decision making logics in directing the traffic flow. For a given traffic junction, nominal number of cameras (or motion capturing devices) may range from 1-4 or more. When vehicles are moving through a region-of-interest with multiple cameras located at different points in the region looking over multiple fields-of-view it is beneficial to track a particular vehicle from one camera view to subsequent camera views in the region. This helps the system 100 in accurately mapping a particular vehicle in the global scope and obtaining its global position in the region irrespective of actual position and angle of the actual camera looking at the vehicle at any particular moment in time. Carrying over of the tracking information would help in the following scenarios:
1. Knowing the time spent by a vehicle at any particular area of the region 2. Avoiding duplicate counts of the same vehicle when viewed upon by multiple cameras leading to over-estimation of the total vehicles in the scene
3. Getting a more accurate multi-view information about the vehicle which would help in further activities such as, for example, 3D reconstruction and even facilitates better tracking.

The challenges in having a multi-camera model are generally of three variants:
a) When two or more cameras have an overlapping field-of-view, it would generate multiple vehicle detections in the multiple camera views. Global location based vehicle registration is required to tackle this problem.
b) When a vehicle is occluded by any static (like a wall, building etc.) or dynamic object (other vehicles such as trucks) it creates a moment in the timeline where there is no accurate estimate of the position of the vehicle from the moment of occlusion to the moment of re-discovery, either by the vehicle moving out of the occluding element or the occluding element (dynamic) moving out the region. The system utilizes predictive tracking and object life-cycle concepts to estimate the confidence and approximate position of the tracked vehicle in such a scenario.
c) When a vehicle enters a region where no cameras are available, which is described as a blindspot, the assumptions similar to a larger occlusion region prevails. The predictive tracking takes into account the current estimated position, direction of motion and speed of the vehicle to estimate the position of the vehicle while it is assumed to move through the blindspot. Once the vehicle exits the blindspot region, the accumulated knowledge, both visual and syntactic cues, of the vehicle as tracked by multiple cameras from multiple angles is used to re-verify the tracking ID of the vehicle to be same as that was predicted to appear out of the blindspot.

When multiple camera views are available for a particular region, it is beneficial to map all the camera fields-of-view onto a single global map which can be the reference for all global validation and localization activities. The challenge here is to take into account the difference in perspective view of each camera and creating a pseudo-birds-eye-view (or global map) from each using the overlapping regions.

The perspective view is understood and corrected based on the principle of parallel lines and vanishing points. For a 3 dimensional scene, there exists three vanishing points in the three axes. Vanishing point is the point (which could be inside or outside the field of view of a camera) where known parallel lines observed in the camera view meet. Knowing two vanishing points in the horizontal plane allows the system to construct a 2D surface which has the same perspective as the scene being looked into. This allows the system to divide the view into equally sized bounds which would serve as a single cell in the global view.

In the case of a physical region having more than one camera view covering it, the region of overlap can be identified and mapped from local camera level to global map level by the use of image registration techniques. On aligning the distinct feature points shared by the views in the overlapping area, the overlapping cells are taken into account and are registered onto the global map.

Embodiments of the present disclosure and associated systems and methods thereof, address the following without changing the video capture infrastructure:

1. Determining the density of the vehicles per lane from single or multiple cameras placed per junction
2. Vehicle count in terms of PCUs (passenger car unit)
3. Determination of direction and velocity of traffic (gross and per vehicle)
4. Multi-camera intra-junction analytics
5. Multi-camera multi-junction analytics
6. Determining stop-line violation (single camera analytics)
7. Time Slice based vehicle counting (single camera analytics)
8. Detecting over-speeding vehicles (single camera analytics)
9. Detecting contraflow and violation of no-parking zone
10. Suggestion of intelligent adaptive traffic signaling
11. Suggesting green corridor for emergency vehicles (e.g., ambulance, and the like)
12. Mapping the real-time analytics onto the cloud through IoT infrastructure Multi-camera intra-junction analytics: A traffic junction may require multiple cameras to monitor all the lanes coming in and out of it. To obtain a comprehensive view of the traffic junction, a system is required which can compile the video feeds from different cameras along with the orientation information of the field-of-view. Also, the camera views may have common areas of overlap which may be used to get a better estimation of the current traffic estimation, using multiple angles of view. The system generates a comprehensive description of the current state of traffic for all the arms coming in and out of the junction, aggregates information from multiple camera views, and the like. The system can output traffic count, properties like vehicle state (moving versus static), vehicle direction (with respect to a reference coordinate such as Map Grid North) and vehicle speed (in conjunction with the camera calibration system).

Multi-camera multi-junction analytics: Traffic pattern estimation and future traffic prediction is meaningful only when done over a large enough area in an urban environment so that traffic flow coming in and out of the network can be computed and modeled with high fidelity. A traffic network consists of multiple traffic junctions and their connecting arms, with well-defined internal flow between participant junctions and also major traffic flows coming into and out of the network from junctions external to the network. A system to monitor and estimate the state of traffic in a network should have the following sub-systems:
a) Time synchronization between data packets collected from different junctions in the network so as to describe a cohesive state of traffic at any instance of time
b) Calculate Estimated Time of Arrival of detected traffic from one junction to another taking into account the vehicle speeds, distance between junctions and current states of traffic
c) Traffic density analysis and Queue—Length estimation of the subsequent junctions and in the network as a whole.
d) Navigation planner which uses current and historical traffic patterns to estimate the travel time between multiple junctions in a network.

Determining stop-line violation: As the system 100 has already detected vehicle contours and the stop line was set up, whenever the vehicle contour crosses the stop line, the associated grid is activated.

Time Slice based vehicle counting: In order to find the vehicle count crossing a particular line, only that particular row of the image array was considered for analysis as there will be minimal effect of the environmental affects. FIGS.

13A through 13E, with reference to FIGS. 1 through 12, depict visual representation of images illustrating the step of applying high frequency suppression in second ($2^{nd}$) order wavelet decomposition on time sliced images of the plurality of motion streams by the system 100 of FIG. 1 in accordance with an example embodiment of the present disclosure. As can be seen through FIGS. 13A through 13E, row of image array is accumulated into another array such that each row in that array represents all the previous frame data (Time Slice Image). To understand the vehicle entering the counting zone, the system checks for high variance in the time slice image as the road has minimal variance than any other object. Contour analysis is done to extract each vehicle for counting. To avoid recounting the same vehicle from the previous time-slice image, the previous detections are moved by a row and compared with the current detections.

Detecting over-speeding vehicles: Determination of vehicle speed is performed by the conjunctions of two systems; the motion and direction detection of vehicles in image space which derives the amount of pixel shift of a tracked point on a vehicles between frames, and then the calibration system comprised in the system 100 which converts this pixel shift between frames into speed in real world coordinates. A feature based tracking of the keypoints in the detected vehicles boundary allows to determine the pixel shift. The keypoints are uniquely described by the neighborhood information surrounding the pixel under question. These unique keypoints are tracked in multiple frames so as to estimate the average shift of the keypoints on the vehicles across frames. The camera calibration system (comprised in the system 100) derives the perspective corrected scales for x, y and z coordinates in the image. This scales allow it to convert the pixel shift into real world units like distance-per-time.

Detecting contraflow and violation of no-parking zone: Determination of vehicle velocity allows the system 100 to determine the direction of the movement as well. This helps in detection for scenarios where traffic along any particular direction of the lane is prohibited. The system 100 confirms the movement of the vehicle in a particular direction for a few frames to remove variability of the motion tracking algorithms. Once the direction of any particular vehicle has been established, the system 100 proceeds to compare the detected direction to the permitted direction of travel along that particular arm of the road. If the vehicle has been found in violation of the regulation, further information about the vehicle can be derived using Automatic Number Plate Recognition (ANPR) systems (known in the art) so as to identify the vehicle for traffic regulation authorities for further administration. No Parking violation is raised when a vehicles stops at a location designated as such, for more than a prescribed time (generally under a minute). The algorithm implemented by the system 100 compares the occupancy of designated areas with the adaptive background model generated to identify possible violators. Once the vehicle has exceeded the duration of occupancy more than the configured duration, an alert may be raised.

Suggestion of intelligent adaptive traffic signaling: The derived statistics of vehicle speeds, traffic densities and predicted traffic patterns using past data analysis can be further used to modify the current traffic light signaling in real time so as to minimize the current and future predicted congestion. Similarly, "waves of green lights" are synchronized to ensure mean-delay-at-signal of vehicles are reduced so that vehicles can proceed from one green light to the next. The succeeding green lights are configured so as to turn green at the estimated time vehicles coming from one junction are scheduled to reach the arm of the next junction. This improves the driving experience and reduces driving induced stresses and mistakes and road rages resulting from it. Traffic signals can comprise a hardware control which are connected to the central traffic monitoring and analytics system. This gives the central system individual control over each traffic light.

Suggesting green corridor for emergency vehicles: Ambulances and other Emergency Response (ER) vehicles have to be given priority during congestion. A turn-by-turn navigation system in the emergency response vehicles provides the fastest routes between any pair of locations taking into account both the crowd sourced traffic congestion information (a la Google Maps®) and the camera based vehicle specific information computed by the computer vision algorithms at the junctions.

Further, the traffic signals can be dynamically adapted in response to the presence of an emergency response vehicle in its vicinity with intention of traversing the junction. This is regulated by the central traffic analytics and monitoring system which have inputs from both the navigation systems mounted on the ER vehicles as well as the traffic signal control systems.

Mapping the real-time analytics onto the cloud through IoT infrastructure (Forest view of the current state of traffic): The position and field of view of the installed cameras at junctions can be mapped onto a transportation map showing the connected junctions. This makes it easier for the user to configure and control each of the installed cameras and set them up for video analytics and traffic data generation. IoT enabled edge devices help in fast, reliable and maintenance friendly hardware infrastructure. Cloud based real-time analytics help in having reliable and scalable systems deployable with ease.

As mentioned above, embodiments of the present disclosure address the technical problem of occlusion of objects by single camera wherein typically when the objects are far away for the camera, view(s) cannot be captured properly. Based on the camera perspective the object may get occluded by other objects. Such issues are handled in multiple camera mechanism as implemented by the system 100 for (traffic video) analytics. In a multi-camera scenario as described and implemented by the present disclosure by way of examples and figures, in global map, image correspondence of the multiple cameras are established based on location and position of the cameras (also referred as motion capturing devices). All cameras report the confirmed objects identified to the global map (e.g., with an object identified i.e., an identifier of an object say a vehicle). From the global map the same object is identified from different camera inputs based on the spatial, structural, motion direction and velocity similarities. This enables to tag that object with the same identifier throughout scenes from multi-cameras thus preventing from redundant count of same vehicles and identifiers associated thereof. The information pertaining to object identifier (of a car) from one motion capturing device of one scene is utilized for comparison with object identifier detection (of the same car) from another motion capturing device of another scene to remove the duplicates and eliminate the redundant count. This ensures that even when an object is partially or completely occluded from one camera view can be tracked based on the view of other camera thereby improving detection and correction of duplicate identifiers pertaining to same object (e.g., a vehicle, say car or the like).

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method comprising:
receiving, a plurality of motion streams captured via a plurality of motion capturing devices, pertaining to an environment, wherein each of the plurality of motion streams comprises a plurality of moving objects;
filtering, using an adaptive background model, background from images comprised in a plurality of de-noised motion streams obtained from the plurality of motion streams to obtain a plurality of moving objects of interest, wherein the plurality of de-noised streams are obtained by removing rain streaks from the time sliced images through determination of pixel intensity variations in a time domain, wherein the plurality of de-noised motion streams are obtained by:
determining pixel intensity variations in time domain for the plurality of moving objects comprised in the plurality of motion streams;
applying high frequency suppression in second (2nd) order wavelet decomposition on time sliced images from the plurality of motion streams;
obtaining darkest illumination points from the plurality of motion streams;
deriving, using the darkest illumination points, a haze equation and transfer function activation thereof; and
de-noising the plurality of motion streams by eliminating rain and fog in the plurality of motion streams using (i) the haze equation and the transfer function activation thereof and (ii) the high frequency suppression in the 2nd order wavelet decomposition being applied;
iteratively generating, using an occlusion map technique, a motion map to identify one or more moving objects along with depth information from the plurality of moving objects of interest;
dynamically tracking, using a tracker technique, the identified one or more moving objects from the plurality of de-noised motion streams, wherein the identified one or more moving objects are dynamically tracked by:
iteratively redetecting, using a tracker resurrection algorithm, the identified one or more moving objects from one or more scenes based on a previous lost history to obtain one or more redetected moving objects trackers, wherein the identified one or more moving objects are iteratively redetected by: obtaining spatial, temporal and dynamic properties of the dynamically tracked one or more moving objects and comparing the redetected moving objects trackers with an original tracker; and
detecting and correcting one or more duplicate detection of identifiers of a unique object from at least one of the redetected moving objects trackers and the original tracker using a tracker teleportation algorithm, wherein the one or more duplicate detection of identifiers of the unique object are corrected by detecting and correcting one or more tracking errors occurred due to false positives based on a Peak Signal to Noise Ratio (PSNR) value and a detection confidence value associated with the identified one or more moving objects in a particular frame.

2. The processor implemented method of claim 1, further comprising generating a global map by extracting information from the plurality of motion capturing devices.

3. The processor implemented method of claim 1, wherein the step of filtering, using an adaptive background model, background from images comprised in the de-noised plurality of motion streams to obtain a plurality of moving objects of interest comprises:
  detecting motion in at least two or more consecutive frames in the images comprised in the de-noised plurality of motion streams;
  mapping pixel displacement associated with the detected motion with background to foreground relationship of a current frame from the at least two or more consecutive frames in the images, wherein the background to foreground relationship in the images is determined by computing mean of variance in pixels comprised in area of the pixel displacement in the images;
  generating background by using a perspective tail end of one or more moving objects comprised in the current frame from the at least two or more consecutive frames; and
  filtering the background from the images based on the mapping of the pixel displacement associated with the detected motion with the background to foreground relationship.

4. The processor implemented method of claim 3, wherein the adaptive background model is generated based on the perspective tail end of the one or more moving objects.

5. The processor implemented method of claim 1, wherein when a new object is detected, a tracker is created, wherein the new object is determined as an Object of Interest (OoI) based on a confidence value computed based on motion direction and consistency in velocity and detection, and wherein upon determining that the Object of Interest (OoI) is being tracked, the OoI is masked from images comprised in the plurality of motion streams prior to performing background learning to refrain from merging of static object of interest with the background.

6. A system, comprising:
  a memory storing instructions;
  one or more communication interfaces; and
  one or more hardware processors coupled to the memory via the one or more communication interfaces, wherein the one or more hardware processors are configured by the instructions to:
    receive, a plurality of motion streams captured via a plurality of motion capturing devices, pertaining to an environment, wherein each of the plurality of motion streams comprises a plurality of moving objects;
    filter, using an adaptive background model, background from images comprised in a plurality of de-noised motion streams obtained from the plurality of motion streams to obtain a plurality of moving objects of interest, wherein the plurality of de-noised streams are obtained by removing rain streaks from the time sliced images through determination of pixel intensity variations in a time domain, wherein the plurality of de-noised motion streams are obtained by:
    determining pixel intensity variations in time domain for the plurality of moving objects comprised in the plurality of motion streams;
    applying high frequency suppression in second (2nd) order wavelet decomposition on time sliced images from the plurality of motion streams;
    obtaining darkest illumination points from the plurality of motion streams;
    deriving, using the darkest illumination points, a haze equation and transfer function activation thereof; and
    de-noising the plurality of motion streams by eliminating rain and fog in the plurality of motion streams using (i) the haze equation and the transfer function activation thereof and (ii) the high frequency suppression in the 2nd order wavelet decomposition being applied;
    iteratively generate, using an occlusion map technique, a motion map to identify one or more moving objects along with depth information from the plurality of moving objects of interest;
    dynamically track, using a tracker technique, the identified one or more moving objects from the plurality of de-noised motion streams, wherein the identified one or more moving objects are dynamically tracked by:
    iteratively redetecting, using a tracker resurrection algorithm, the identified one or more moving objects from one or more scenes based on a previous lost history to obtain one or more redetected moving objects trackers, wherein the identified one or more moving objects are iteratively redetected by: obtaining spatial, temporal and dynamic properties of the dynamically tracked one or more moving objects and comparing the redetected moving objects trackers with an original tracker; and
    correcting one or more duplicate detection of identifiers of a unique object from at least one of the redetected moving objects trackers and the original tracker using a tracker teleportation algorithm, wherein the one or more duplicate detection of identifiers of a unique object are corrected by detecting and correcting one or more tracking errors occurred due to false positives based on a Peak Signal to Noise Ratio (PSNR) value and a detection confidence value associated with the identified one or more moving objects in a particular frame.

7. The system of claim 6, wherein the one or more hardware processors are further configured by the instructions to generate a global map by extracting information from the plurality of motion capturing devices.

8. The system of claim 6, wherein the background from images comprised in the de-noised plurality of motion streams is filtered to obtain a plurality of moving objects of interest by:
  detecting motion in at least two or more consecutive frames in the images comprised in the de-noised plurality of motion streams;
  mapping pixel displacement associated with the detected motion with background to foreground relationship of a current frame from the at least two or more consecutive frames in the images, wherein the background to foreground relationship in the images is determined by computing mean of variance in pixels comprised in area of the pixel displacement in the images;
  generating background by using a perspective tail end of one or more moving objects comprised in the current frame from the at least two or more consecutive frames;

and filtering the background from the images based on the mapping of the pixel displacement associated with the detected motion with the background to foreground relationship.

9. The system of claim 8, wherein the adaptive background model is generated based on the perspective tail end of the one or more moving objects.

10. The system of claim 6, wherein when a new object is detected, a tracker is created, wherein the new object is determined as an Object of Interest (OoI) based on a confidence value computed based on motion direction and consistency in velocity, and detection and wherein upon determining that the Object of Interest (OoI) is being tracked, the OoI is masked from images comprised in the plurality of motion streams prior to performing background learning to refrain from merging of static object of interest with the background.

11. One or more non-transitory machine readable information storage mediums comprising one or more instructions which when executed by one or more hardware processors causes a method for dynamic multi-camera tracking of moving objects in motion streams, comprising:

receiving, via the one or more hardware processors, a plurality of motion streams captured via a plurality of motion capturing devices, pertaining to an environment, wherein each of the plurality of motion streams comprises a plurality of moving objects;

filtering, using an adaptive background model executed via the one or more hardware processors, background from images comprised in a plurality of de-noised motion streams obtained from the plurality of motion streams to obtain a plurality of moving objects of interest, wherein the plurality of de-noised streams are obtained by removing rain streaks from the time sliced images through determination of pixel intensity variations in a time domain wherein the plurality of de-noised motion streams are obtained by:

determining pixel intensity variations in time domain for the plurality of moving objects comprised in the plurality of motion streams;

applying high frequency suppression in second (2nd) order wavelet decomposition on time sliced images from the plurality of motion streams;

obtaining darkest illumination points from the plurality of motion streams;

deriving, using the darkest illumination points, a haze equation and transfer function activation thereof; and de-noising the plurality of motion streams by eliminating rain and fog in the plurality of motion streams using (i) the haze equation and the transfer function activation thereof and (ii) the high frequency suppression in the 2nd order wavelet decomposition being applied;

iteratively generating, using an occlusion map technique executed via the one or more hardware processors, a motion map to identify one or more moving objects along with depth information from the plurality of moving objects of interest;

dynamically tracking, using a tracker technique executed via the one or more hardware processors, the identified one or more moving objects from the plurality of de-noised motion streams, wherein the identified one or more moving objects are dynamically tracked by:

iteratively redetecting, using a tracker resurrection algorithm executed via the one or more hardware processors, the identified one or more moving objects from one or more scenes based on a previous lost history to obtain one or more redetected moving objects trackers, wherein the identified one or more moving objects are iteratively redetected by: obtaining spatial, temporal and dynamic properties of the dynamically tracked one or more moving objects and comparing the redetected moving objects trackers with an original tracker; and detecting and correcting one or more duplicate detection of identifiers of a unique object from at least one of the redetected moving objects trackers and the original tracker using a tracker teleportation algorithm, wherein the one or more duplicate detection of identifiers of a unique object are corrected by detecting and correcting one or more tracking errors occurred due to false positives based on a Peak Signal to Noise Ratio (PSNR) value and a detection confidence value associated with the identified one or more moving objects in a particular frame.

12. The one or more non-transitory machine readable information storage mediums of claim 11, wherein the one or more instructions when executed by the one or more hardware processors further cause generating a global map by extracting information from the plurality of motion capturing devices.

13. The one or more non-transitory machine readable information storage mediums of claim 11, wherein the step of filtering, using an adaptive background model, background from images comprised in the de-noised plurality of motion streams to obtain a plurality of moving objects of interest comprises:

detecting motion in at least two or more consecutive frames in the images comprised in the de-noised plurality of motion streams;

mapping pixel displacement associated with the detected motion with background to foreground relationship of a current frame from the at least two or more consecutive frames in the images, wherein the background to foreground relationship in the images is determined by computing mean of variance in pixels comprised in area of the pixel displacement in the images;

generating background by using a perspective tail end of one or more moving objects comprised in the current frame from the at least two or more consecutive frames; and filtering the background from the images based on the mapping of the pixel displacement associated with the detected motion with the background to foreground relationship.

14. The one or more non-transitory machine readable information storage mediums of claim 13, wherein the adaptive background model is generated based on the perspective tail end of the one or more moving objects.

15. The one or more non-transitory machine readable information storage mediums of claim 11, wherein when a new object is detected, a tracker is created, wherein the new object is determined as an Object of Interest (OoI) based on a confidence value computed based on motion direction and consistency in velocity and detection, and wherein upon determining that the Object of Interest (OoI) is being tracked, the OoI is masked from images comprised in the plurality of motion streams prior to performing background learning to refrain from merging of static object of interest with the background.

* * * * *